United States Patent
Fukawatase et al.

(10) Patent No.: US 7,744,117 B2
(45) Date of Patent: Jun. 29, 2010

(54) KNEE AIRBAG DEVICE FOR VEHICLE

(75) Inventors: Osamu Fukawatase, Nishikamo-gun (JP); Tomoyuki Moro, Toyota (JP); Kenji Imamura, Kosai (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 212 days.

(21) Appl. No.: 11/979,519

(22) Filed: Nov. 5, 2007

(65) Prior Publication Data

US 2008/0106080 A1  May 8, 2008

(30) Foreign Application Priority Data

Nov. 7, 2006  (JP) .............................. 2006-301672

(51) Int. Cl.
   *B60R 21/231*  (2006.01)
(52) U.S. Cl. .................................... 280/730.1; 280/732
(58) Field of Classification Search ............. 280/730.1, 280/732, 751, 752
See application file for complete search history.

(56) References Cited

U.S. PATENT DOCUMENTS

| 5,570,901 | A | 11/1996 | Fyrainer |  |
|---|---|---|---|---|
| 6,685,217 | B2 * | 2/2004 | Abe ........................ | 280/730.1 |
| 7,182,365 | B2 | 2/2007 | Takimoto et al. |  |
| 2002/0149187 | A1 | 10/2002 | Holtz et al. |  |
| 2008/0122205 | A1 * | 5/2008 | Imamura et al. ......... | 280/730.1 |

FOREIGN PATENT DOCUMENTS

| DE | 102 50 405 A1 | 5/2003 |
|---|---|---|
| JP | A 08-301054 | 11/1996 |
| JP | A 09-104317 | 4/1997 |
| JP | A-9-123863 | 5/1997 |
| JP | A 10-071911 | 3/1998 |
| JP | B2 2759065 | 5/1998 |
| JP | A-2000-225911 | 8/2000 |
| JP | A 2001-106013 | 4/2001 |
| JP | 2001-233157 | 8/2001 |

(Continued)

OTHER PUBLICATIONS

Mar. 3, 2010 Office Action issued in German Patent Application No. 10 2007 000 635.9 (with translation).

*Primary Examiner*—Paul N Dickson
*Assistant Examiner*—Drew Brown
(74) *Attorney, Agent, or Firm*—Oliff & Berridge, PLC

(57) ABSTRACT

A knee airbag device for a vehicle includes a gas generation portion that is operated to generate gas; a knee airbag that is disposed in a folded state at a predetermined position in a vehicle, wherein when the knee airbag receives the gas, the knee airbag is inflated and deployed toward an area below a steering column so that the knee airbag is disposed between knees of an occupant and a lower portion of an instrument panel; and a thickness regulation member that is provided in the knee airbag at a position in a contact portion that contacts each of the knees of the occupant, and that regulates the thickness of the knee airbag such that the thickness of the knee airbag at the position in the contact portion is smaller than the thickness of the knee airbag in a portion other than the contact portion.

7 Claims, 5 Drawing Sheets

FOREIGN PATENT DOCUMENTS

| | | |
|---|---|---|
| JP | A 2002-037003 | 2/2002 |
| JP | A-2003-286626 | 10/2003 |
| JP | A 2004-098891 | 4/2004 |
| JP | A-2005-289257 | 10/2005 |
| JP | A-2005-335593 | 12/2005 |
| JP | B2 3752920 | 3/2006 |
| JP | B2 3760424 | 3/2006 |
| JP | A 2006-224776 | 8/2006 |
| WO | WO 02/04262 A1 | 1/2002 |

* cited by examiner

KNEE AIRBAG DEVICE FOR VEHICLE

INCORPORATION BY REFERENCE

The disclosure of Japanese Patent Application No. 2006-301672 filed on Nov. 7, 2006 including the specification, drawings and abstract is incorporated herein by reference in its entirety.

BACKGROUND OF THE INVENTION

1. Field of the Invention

The invention relates to a knee airbag device for a vehicle, which includes a knee airbag that is inflated and deployed to restrain the knees of an occupant when a frontal collision occurs.

2. Description of the Related Art

Various knee airbag devices for a vehicle have been proposed to protect the knees of an occupant. For example, each of International Patent Publication WO2002/004262, and Japanese Patent Application Publication No. 9-104317 describes a knee airbag device that includes an airbag module disposed inside a column cover for a steering column.

However, in the knee airbag device described in each of the above publications, because a knee airbag, which is inflated and deployed toward an area below the lower surface of the column cover, has a certain thickness, improvement needs to be made as described below.

In general, when an occupant is small, the knees of the occupant are positioned close to an instrument panel. Therefore, a gap between the knees and the instrument panel is narrow, and thus, it is difficult to deploy the knee airbag. Also, when the knees are positioned close to the instrument panel, the knee airbag may enter an area between the knees, and may widen the distance between the knees.

Accordingly, the knee airbag device described in each of the above publications needs to be improved.

SUMMARY OF THE INVENTION

The invention provides a knee airbag device for a vehicle, which includes a knee airbag that is smoothly inflated and deployed between knees of an occupant and an instrument panel even when a gap between the knees of the occupant and the instrument panel is narrow.

A first aspect of the invention relates to a knee airbag device for a vehicle. The knee airbag device includes a gas generation portion, a knee airbag and a thickness regulation member. The gas generation portion is disposed in a vehicle, and is operated to generate the gas. The knee airbag is stored in a folded state at a predetermined position in a vehicle. When the knee airbag receives gas, the knee airbag is inflated and deployed toward an area below a steering column so that the knee airbag is disposed between knees of an occupant and the lower portion of an instrument panel. The thickness regulation member is provided in the knee airbag at a position in a contact portion that contacts each of the knees of the occupant, and regulates the thickness of the knee airbag such that the thickness of the knee airbag at the position in the contact portion is smaller than the thickness of the knee airbag at a portion other than the contact portion.

According to the above-described aspect, when the gas is supplied into the knee airbag stored in the folded state at the predetermined position in the vehicle, the knee airbag is inflated and deployed toward the area below the steering column so that the knee airbag is disposed between the knees of the occupant and the lower portion of the instrument panel. As a result, the knees of the occupant is protected.

In the above-described embodiment, the thickness regulation member is provided in the knee airbag at the position in the contact portion that contacts each of the knees of the occupant. Therefore, the thickness of the knee airbag at the position in the contact portion is smaller than the thickness of the knee airbag at the portion other than the contact portion. Thus, it is possible to smoothly deploy the knee airbag even when the occupant is small, and the gap between the knees of the occupant and the lower portion of the instrument panel is narrow.

In the knee airbag device according to the above-described aspect, the knee airbag may further include an instrument panel-side foundation cloth positioned close to an instrument panel, and an occupant-side foundation cloth positioned close to the occupant. The thickness regulation member may be a pinched portion formed by joining together the instrument panel-side foundation cloth and the occupant-side foundation cloth at the position in the contact portion.

Further, the knee airbag may be formed by sewing together the instrument panel-side foundation cloth and the occupant-side foundation cloth at a peripheral portion. When the instrument panel-side foundation cloth and the occupant-side foundation cloth are sewn together at the peripheral portion, the pinched portion may be formed by sewing the instrument panel-side foundation cloth and the occupant-side foundation cloth toward the inside of the knee airbag at the position in the contact portion.

According to the above-described aspect, the knee airbag further includes the instrument panel-side foundation cloth positioned close to the instrument panel, and the occupant-side foundation cloth positioned close to the occupant. The thickness regulation member is the pinched portion formed by sewing together the instrument panel-side foundation cloth and the occupant-side foundation cloth at the position in the contact portion, when the instrument panel-side foundation cloth and the occupant-side foundation cloth are sewn together at the peripheral portion. Therefore, it is possible to easily make the thickness of the knee airbag small only at the position in the contact portion that contacts each of the knees of the occupant, without increasing the number of components. Also, because the number of components is not increased, the knee airbag in the folded state does not take up much space.

In the knee airbag device according to the above-described aspect, the knee airbag may further include an instrument panel-side foundation cloth positioned close to an instrument panel, and an occupant-side foundation cloth positioned close to the occupant. The thickness regulation member may be a connection member made of cloth, which connects the instrument panel-side foundation cloth and the occupant-side foundation cloth in a direction of the thickness of the knee airbag, and which restricts the thickness of the knee airbag at the position in the contact portion.

According to the above-described aspect, the knee airbag further includes the instrument panel-side foundation cloth positioned close to the instrument panel, and the occupant-side foundation cloth positioned close to the occupant. The thickness regulation member is the connection member made of cloth, which connects the instrument panel-side foundation cloth and the occupant-side foundation cloth in a direction of the thickness of the knee airbag, and which restricts the thickness of the knee airbag at the position in the contact portion. Therefore, the width of the connection member made of cloth can be set to any value although the number of components is increased. Accordingly, when the thickness of the knee airbag is made small at the position in the contact portion, it is possible to easily adjust the thickness of the knee airbag at the position in the contact portion, for example, to approximately a half of, or a third of the thickness of the knee airbag at the general portion (i.e., the portion other than the contact portion).

In the knee airbag device according to the above-described aspect, the knee airbag may further include an instrument panel-side foundation cloth positioned close to an instrument panel, and an occupant-side foundation cloth positioned close to the occupant. The thickness regulation member may be an indentation which is formed in a peripheral portion of the knee airbag at the position in the contact portion, and which is indented toward an inside of the knee airbag, wherein the peripheral portion of the knee airbag is formed by joining the instrument panel-side foundation cloth and the occupant-side foundation cloth at each periphery of the instrument panel-side foundation cloth and the occupant-side foundation cloth. The indentation may be formed by sewing together the instrument panel-side foundation cloth and the occupant-side foundation cloth, each of which has a shape indented toward the inside of the knee airbag at the position in the contact portion.

According to the above-described aspect, the knee airbag further includes the instrument panel-side foundation cloth positioned close to the instrument panel, and the occupant-side foundation cloth positioned close to the occupant. The thickness regulation member is the indentation which is formed in the peripheral portion of the knee airbag at the position in the contact portion, and which is indented toward the inside of the knee airbag, wherein the peripheral portion of the knee airbag is formed by joining the instrument panel-side foundation cloth and the occupant-side foundation cloth at each periphery of the instrument panel-side foundation cloth and the occupant-side foundation cloth. The indentation is formed by sewing together the instrument panel-side foundation cloth and the occupant-side foundation cloth, each of which has a shape indented toward the inside of the knee airbag at the position in the contact portion. Therefore, it is possible to easily make the thickness of the knee airbag small only at the position in the contact portion that contacts each of the knees of the occupant, without increasing the number of components. Also, because the number of components is not increased, the knee airbag in the folded state does not take up much space. Further, because the shape of each of the instrument panel-side foundation cloth and the occupant-side foundation cloth is changed, only the process of sewing the instrument panel-side foundation cloth and the occupant-side foundation cloth together at the peripheral portion is required. That is, for example, the process of forming pinched portion in the knee airbag at the position in the contact portion that contacts each of the knees of the occupant is not required. Therefore, the instrument panel-side foundation cloth and the occupant-side foundation cloth are easily sewn together.

In the knee airbag device according to the above-described aspect, the knee airbag may be stored in the folded state inside a column cover for the steering column.

According to the above-described aspect, the knee airbag device is provided inside the column cover. The knee airbag is generally stored in the folded state inside the column cover for the steering column. When a frontal collision occurs, the knee airbag is inflated and deployed from the column cover for the steering column so that the knee airbag is disposed between the knees of the occupant and the lower portion of the instrument panel.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

First Embodiment

Figure 1:
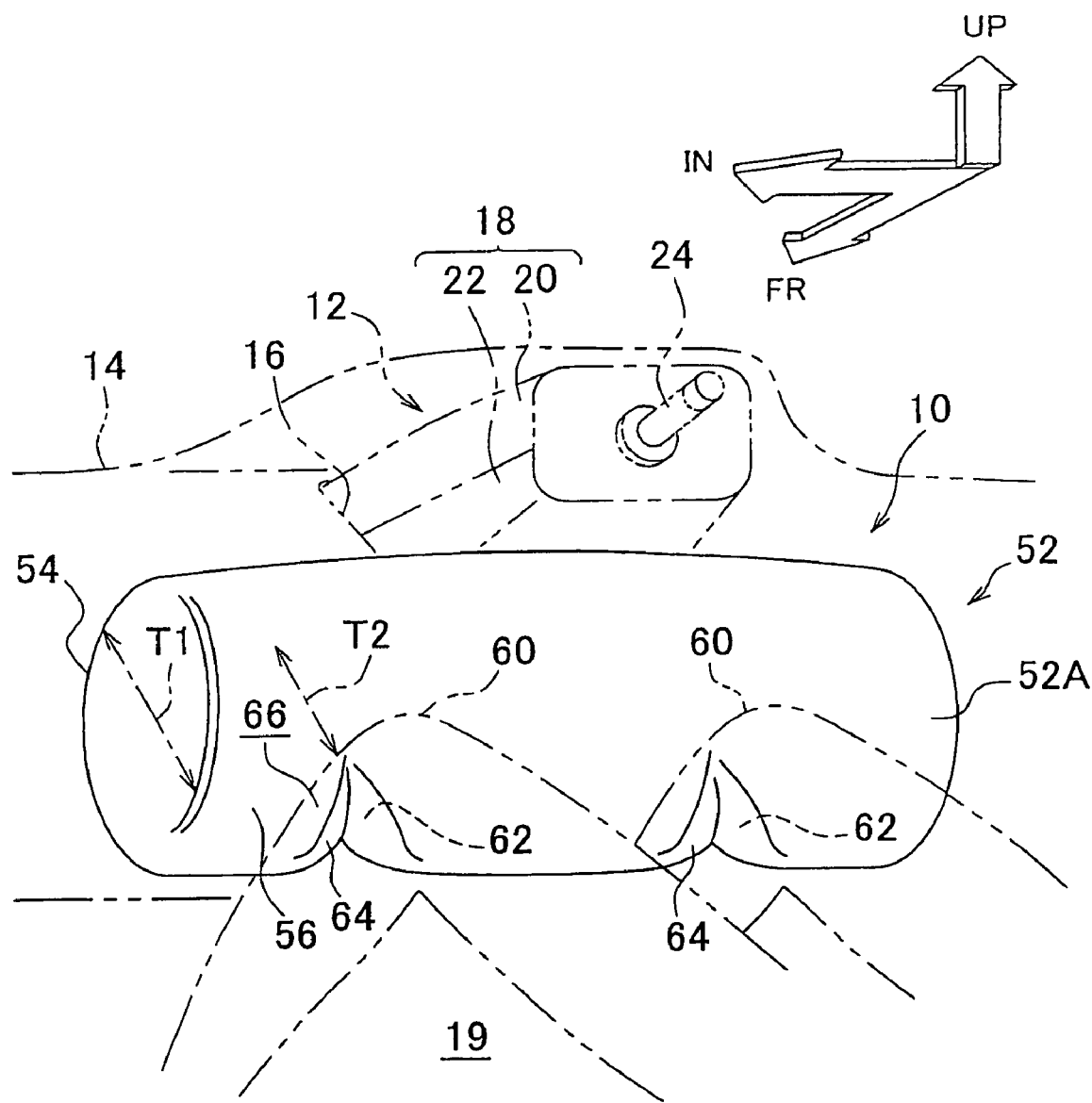
FIG. 1 is a perspective view showing a knee airbag device according to a first embodiment, which is operated, and which is viewed from the rear of a vehicle.
Figure 2:
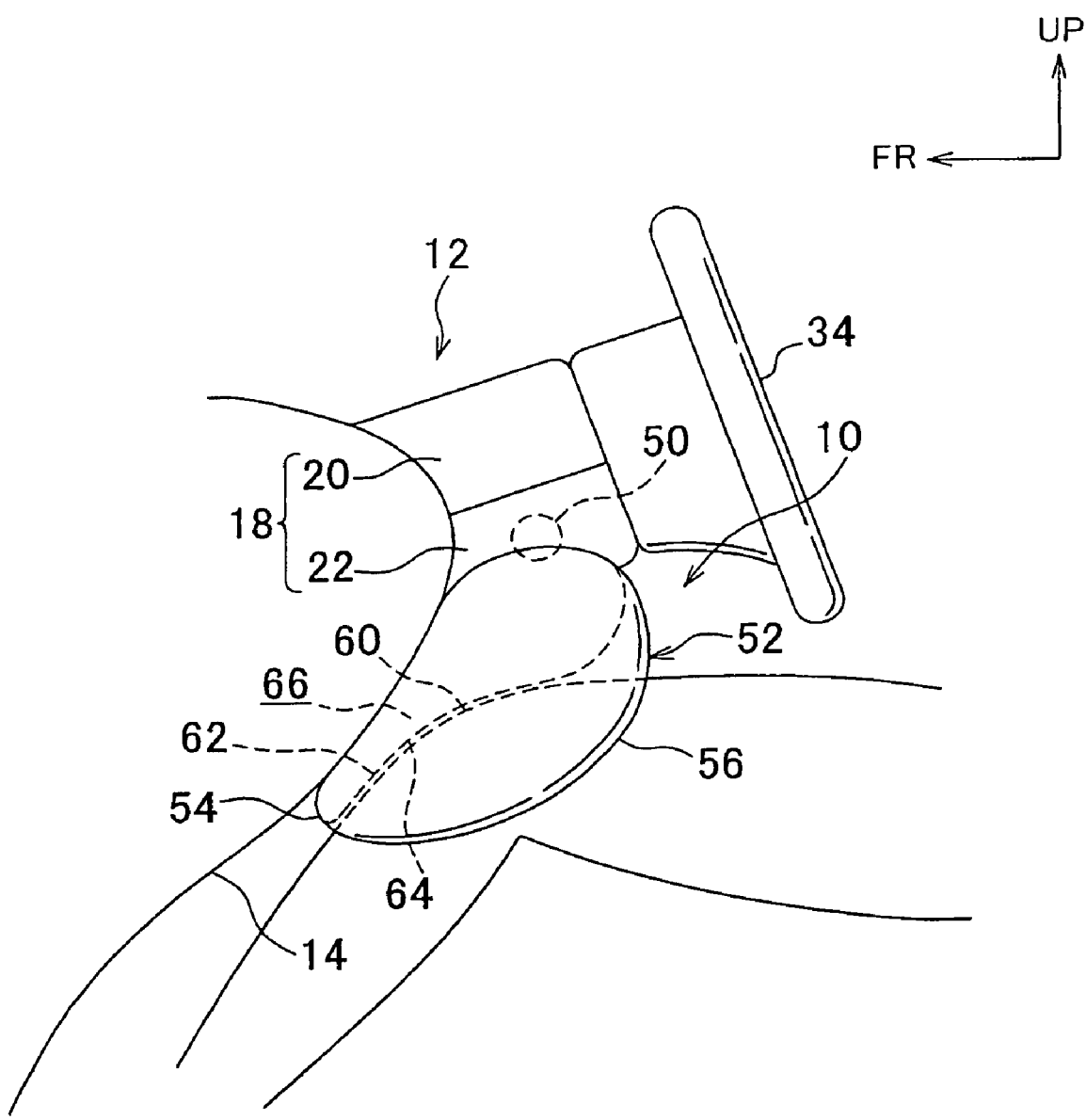
FIG. 2 is a lateral view showing the knee airbag device shown in FIG. 1, which is operated, and which is viewed from the side of the vehicle.

Hereinafter, a knee airbag device for a vehicle according to a first embodiment of the invention will be described with reference to FIG. 1 to FIG. 3. In FIG. 1, the arrow FR indicates the front of a vehicle. The arrow UP indicates the top of the vehicle. The arrow IN indicates the inside of the vehicle in a vehicle-width direction.

Figure 3A:
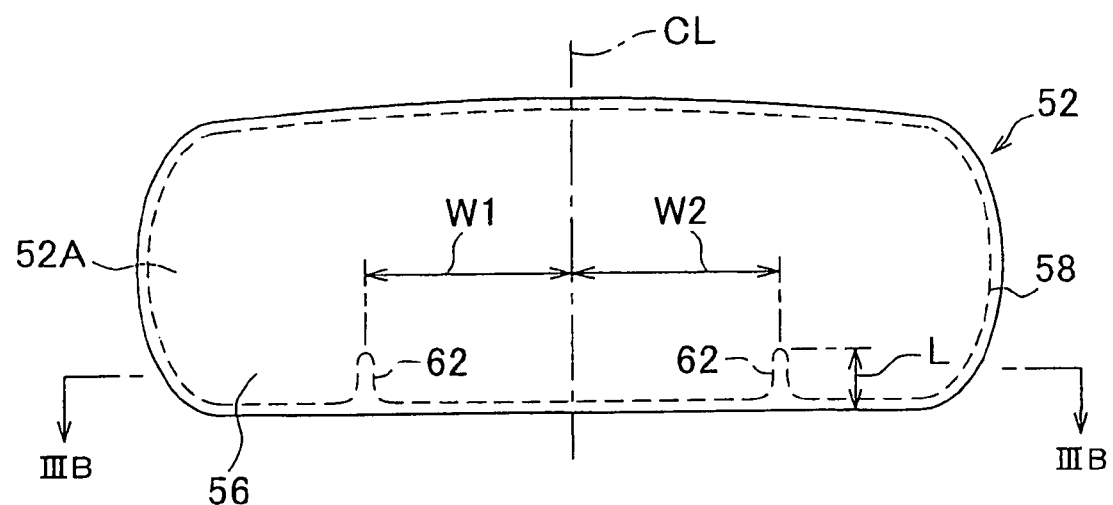
FIG. 3A is a plan view showing the configuration of a knee airbag according to the first embodiment, which is viewed from the side of an occupant-side foundation cloth.
Figure 3B:
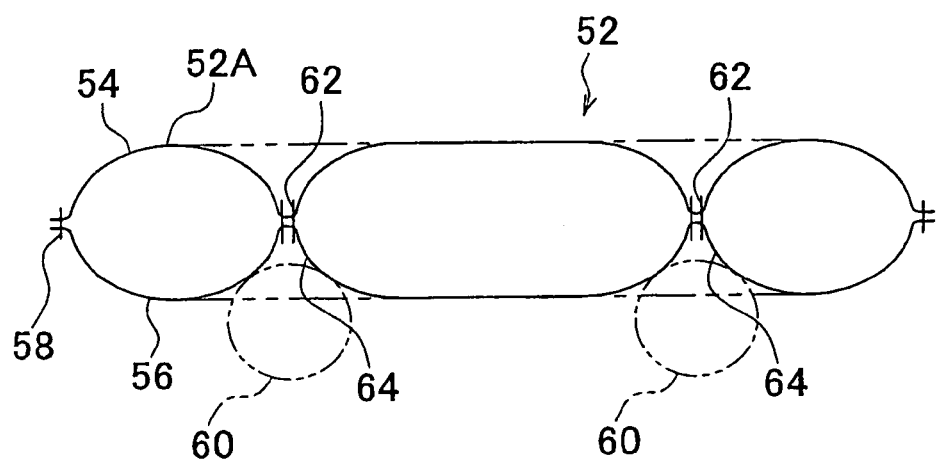
FIG. 3B is a cross sectional view showing the knee airbag shown in FIG. 3A, taken along the line IIIB-IIIB in FIG. 3A.

FIG. 1 is a perspective view showing a knee airbag device according to an embodiment, which is operated, and which is viewed from the rear of the vehicle. FIG. 2 is a lateral view showing the knee airbag device that is operated. FIG. 3A is a plan view showing the configuration of a knee airbag according to the first embodiment. FIG. 3B is a cross sectional view of the main portion of the knee airbag that is inflated and deployed.

As shown in FIG. 1 to FIGS. 3A and 3B, the knee airbag device 10 is disposed under the rear end of the steering column 12. That is, an opening portion 16 is formed on a portion of the instrument panel 14, which faces a driver seat. The steering column 12 is inserted through the opening portion 16 such that the steering column 12 is inclined downward toward the front of the vehicle. A column cover 18 is disposed adjacent to the opening portion 16 of the instrument panel 14. The column cover 18 covers the rear end portion of the steering column 12. The column cover 18 protrudes toward a vehicle cabin 19. The column cover 18 is divided into two portions, i.e., an upper portion and a lower portion. More specifically, the column cover 18 includes a column upper cover 20 and a column lower cover 22.

A steering main shaft 24 is disposed in the core of the steering column 12. A steering wheel 34 is fixed at the rear end of the steering main shaft 24. A driver operates the steering wheel 34 to steer the vehicle. The steering main shaft 24 is rotatably supported by a cylindrical column tube (not shown) through a bearing. The column tube is supported by a vehicle body. The column tube is supported by an instrument panel reinforce through a bracket (not shown). The instrument panel reinforce has high rigidity, and extends along a vehicle-width direction.

[Entire Configuration of the Knee Airbag Device 10]

Next, the entire configuration of the knee airbag device 10 will be described.

The knee airbag device 10 includes an inflator 50 (refer to FIG. 2) and a knee airbag 52, as functional components. The inflator 50 has a substantially cylindrical shape, and functions as gas generation means. The knee airbag 52 is usually stored in a folded state inside the column lower cover 22. When the inflator 50 is operated to generate gas, the knee airbag 52 is inflated and deployed by the gas. The inflator 50 and the knee airbag 52 are housed in a module case (not shown) made of cloth that is material having flexibility.

[Configuration of Main Portion of Knee Airbag Device 10]

As shown in FIG. 1 and FIGS. 3A and 3B, the above-described knee airbag 52 is formed by overlapping an instrument panel-side foundation cloth 54 and an occupant-side foundation cloth 56 with each other, and sewing the instrument panel-side foundation cloth 54 and the occupant-side foundation cloth 56 together at a peripheral portion (hereinafter, referred to as "peripheral sewn portion 58"). The instrument panel-side foundation cloth 54 is disposed close to the instrument panel 14. The occupant-side foundation cloth 56, which has the same shape as that of the instrument panel-side foundation cloth 54, is formed by cutting cloth. The occupant-side foundation cloth 56 is disposed close to an occupant.

In the embodiment, as shown in FIGS. 3A and 3B, pinched portions 62 are formed in the knee airbag 52 at positions in contact portions that contact the knees 60 of an occupant. That is, the pinched portions 62 are symmetrically formed at predetermined distances W1 and W2 from the center line CL (refer to FIG. 3A) of the knee airbag 52 (W1=W2). The pinched portions 62 may be regarded as the thickness regulation member. When the instrument panel-side foundation cloth 54 and the occupant-side foundation cloth 56 are sewn together at the peripheral portion, the pinched portions 62 are formed by sewing the instrument panel-side foundation cloth 54 and the occupant-side foundation cloth 56 toward the inside of the knee airbag 52 (along the center line CL of the knee airbag 52 (refer to FIG. 3A)) at (two) positions in the (two) contact portions that contact the knees 60 (refer to FIG. 1 and FIG. 3B) so that each pinched portion 62 has a substantially U-shape. The pinched amount of the pinched portion 62 is set to a predetermined length L (refer to FIG. 3A).

When the knee airbag 52 is inflated, the gas does not flow into the pinched portions 62. As a result, in the knee airbag 52, recessed portions 64 (refer to FIG. 1) are formed in the contact portions that contact the knees 60 of the occupant. Each recess portion 64 has a substantially V-shape when viewed in the direction of the axis of the steering column 12. Thus, the thickness of the knee airbag 52 at the positions where the pinched portions 62 are formed is smaller than the thickness of the knee airbag 52 at a general portion 52A (i.e., the portion other than the contact portions). That is, as shown in FIG. 1, the thickness T2 of the knee airbag 52 at the positions where the pinched portions 62 are formed is smaller than the thickness T1 of the knee airbag 52 at the general portion 52A (the relation that T2 <Ti is satisfied).

[Advantageous Effects in the Embodiment]

Next, advantageous effects obtained in the embodiment will be described.

When a frontal collision occurs (or when it is predicted that a frontal collision will occur), collision detection means (not shown) determines that a frontal collision occurs (or predicts that a frontal collision will occur), and outputs a signal to an airbag ECU (not shown). When the airbag ECU determines that airbag devices should be operated, a driver seat airbag device is operated to inflate a driver seat airbag (not shown) on the steering wheel 34, and the knee airbag device 10 is operated. That is, a predetermined current is supplied to the inflator 50 of the knee airbag device 10, and thus, the inflator 50 is operated. As a result, the inflator 50 generates gas, and the gas is supplied to the knee airbag 52 stored in a folded state, and thus the knee airbag 52 is inflated. When the inflation pressure of the knee airbag 52 applied to the column lower cover 22 reaches a predetermined value, the column lower cover 22 is torn along a tear line (break portion), which is not shown, provided on the column lower cover 22, and thus, an airbag door is opened. Thus, the knee airbag 52 is inflated and deployed toward an area below the steering column 12 and areas on the sides of the steering column 12. As a result, the knee airbag 52 is disposed between the lower portion of the instrument panel 14 and the knees 60 of the occupant, and thus, the knee airbag 52 protest the knees 60.

In the embodiment, the pinched portions 62 are formed in the knee airbag 52 at the positions in the contact portions that contact the knees 60 of the occupant. The thickness T2 of the knee airbag 52 at the positions in the contact portions that contact the knees 60 is smaller than the thickness T1 of the knee airbag 52 at the general portion 52A. As a result, the recessed portions 64 are formed in the occupant-side of the knee airbag 52. Each recessed portion 64 has a substantially V-shape when viewed in the direction of the axis of the steering column 12. The thickness T2 of the knee airbag 52 at the positions where the recessed portions 64 are formed is smaller than the thickness T1 of the knee airbag 52 at the general portion 52A. Therefore, even when a gap 66 (refer to FIG. 2) between the knees 60 of the occupant and the lower portion of the instrument panel 14 is narrow, the knee airbag 52 easily, quickly and smoothly enters the gap 66 and is inflated. Thus, in the embodiment, even when the occupant is small, and the gap 66 between the knees 60 of the occupant and the lower portion of the instrument panel 14 is narrow, the knee airbag 52 is smoothly deployed.

Further, in the embodiment, the knee airbag 52 includes the instrument panel-side foundation cloth 54 disposed close to the instrument panel 14, and the occupant-side foundation cloth 56 disposed close to the occupant. The pinched portions 62 are formed by sewing together the instrument panel-side foundation cloth 54 and the occupant-side foundation cloth 56 at the positions in the contact portions that contact the knees 60 of the occupant, when the instrument panel-side foundation cloth 54 and the occupant-side foundation cloth 56 are sewn together at the peripheral portion. Therefore, it is possible to easily make the thickness of the knee airbag 52 small only at the positions in the contact portions that contact the knees 60 of the occupant, without increasing the number of components. Also, because the number of components is not increased, the knee airbag 52 in the folded state does not take up much space. As a result, in the embodiment, it is possible to provide the thickness regulation member with a low-cost configuration, and to reduce the size of the knee airbag device 10.

Second Embodiment

Hereinafter, a knee airbag device for a vehicle according to a second embodiment of the invention will be described with reference to FIGS. 4A to 4C. The same and corresponding portions as those in the first embodiment will be denoted with the same reference numerals, and the description thereof will be omitted.

Figure 4A:
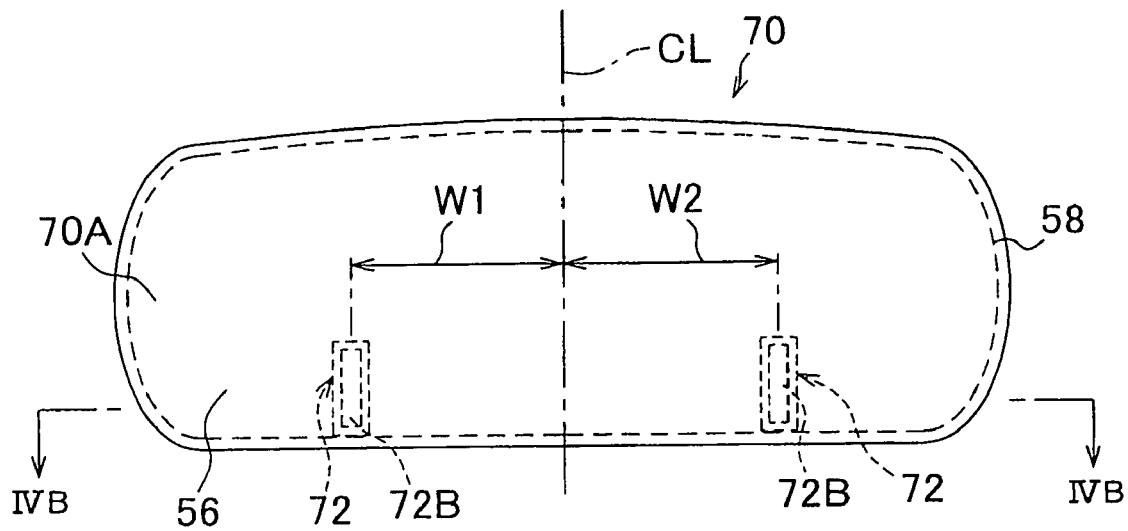
FIG. 4A is a plan view showing the configuration of a knee airbag according to a second embodiment, which is viewed from the side of an occupant-side foundation cloth.
Figure 4B:
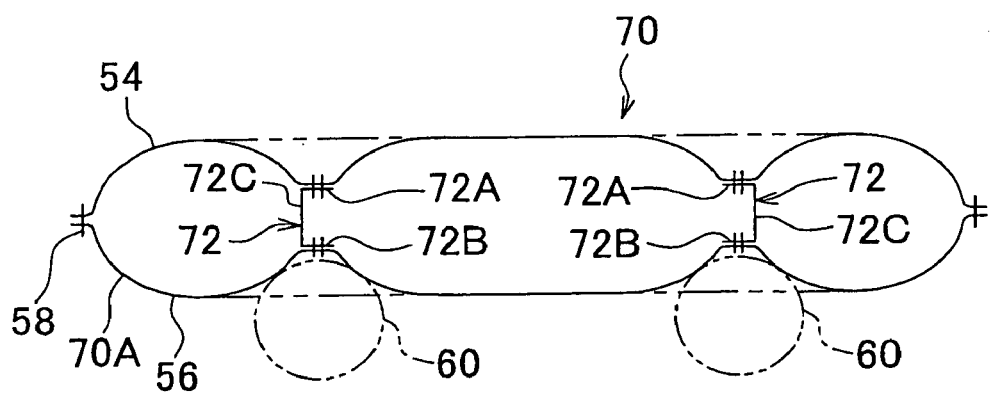
FIG. 4B is a cross sectional view showing the knee airbag shown in FIG. 4A, taken along the line IVB-IVB in FIG. 4A.
Figure 4C:
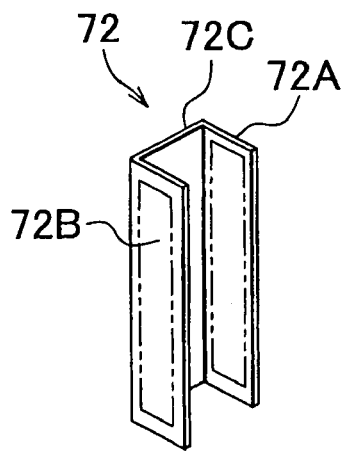
FIG. 4C is an enlarged perspective view showing a strap shown in FIG. 4A.

As shown in FIGS. 4A to 4C, in the second embodiment, a knee airbag 70 includes an instrument panel-side foundation cloth 54 and an occupant-side foundation cloth 56. Straps 62 are provided inside the knee airbag 70 at positions in contact portions that contact the knees 60. Each strap 62 has an angular U-shape cross section. The straps 70 may be regarded as the thickness regulation member and the connection member. One side portion 72A of each strap 72 is sewn to the instrument panel-side foundation cloth 54 and the other side portion 72B is sewn to the occupant-side foundation cloth 56. The thickness of the inflated and deployed knee airbag 70 at the positions in the contact portion that contact the knees 60 of the occupant is restricted (regulated) by adjusting the width of an intermediate portion 72C of each strap 72. The intermediate portion 72C connects the side portion 72A and the other side portion 72B. The straps 72 are made of cloth.

[Advantageous Effects]

In the above-described configuration, when the knee airbag 70 is inflated and deployed, the thickness of the knee airbag 70 at the positions in the contact portions that contact the knees 60 of the occupant is restricted by the pair of right and left straps 72. Therefore, the thickness of the knee airbag 70 at the positions in the contact portions is smaller than the thickness of the knee airbag 70 at the general portion 70A. Accordingly, as in the first embodiment, even when the gap 66 between the knees 60 of the occupant and the lower portion of the instrument panel 14 is narrow, the knee airbag 70 easily, quickly and smoothly enters the gap 66 and is inflated.

Further, the width of the intermediate portion 72C of the strap 72 can be set to any value. Therefore, when the thickness of the knee airbag 70 is made small at the positions in the contact portions that contact the knees 60 of the occupant, it is possible to easily adjust the thickness of the knee airbag 70 at the positions in the contact portions that contact the knees 60, for example, to approximately a half of, or a third of the thickness of the knee airbag 70 at the general portion 70A.

Third Embodiment

Hereinafter, a knee airbag device for a vehicle according to a third embodiment of the invention will be described with reference to FIGS. 5A and 5B. The same and corresponding portions as those in the first embodiment will be denoted with the same reference numerals, and the description thereof will be omitted.

Figure 5A:
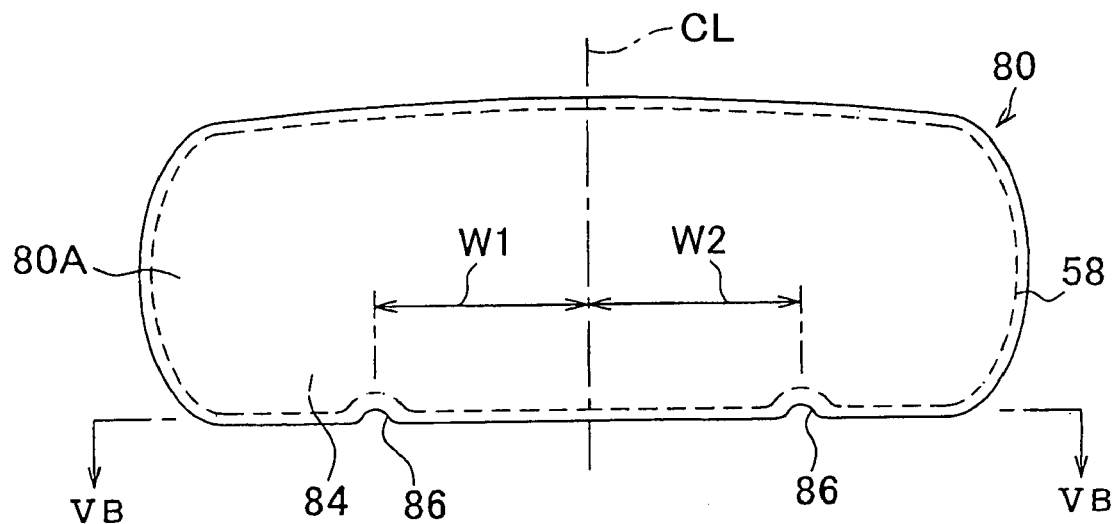
FIG. 5A is a plan view showing the configuration of a knee airbag according to a third embodiment, which is viewed from the side of an occupant-side foundation cloth.
Figure 5B:
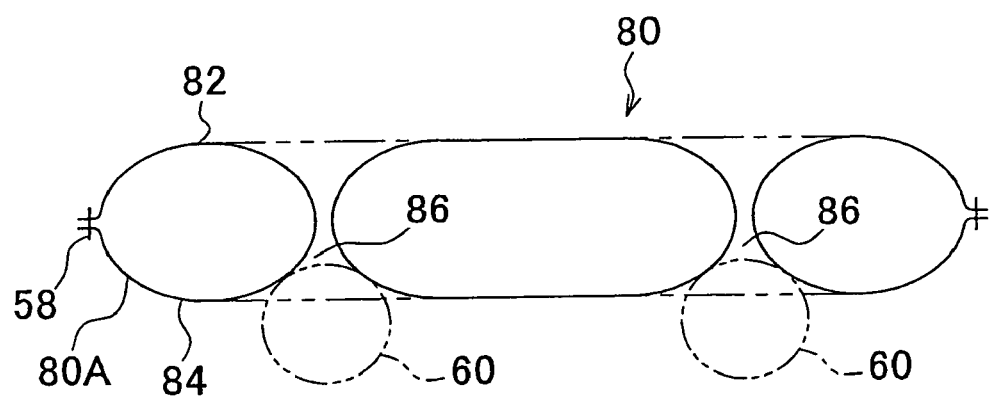
FIG. 5B is a cross sectional view showing the knee airbag shown in FIG. 5A, taken along the line VB-VB in FIG. 5A.

As shown in FIGS. 5A and 5B, in the third embodiment, a knee airbag 80 includes an instrument panel-side foundation cloth 82 and an occupant-side foundation cloth 84, as in the first embodiment and the second embodiment. In addition, in the third embodiment, each of the instrument panel-side foundation cloth 82 and the occupant-side foundation cloth 84 is formed by cutting cloth so that each of the instrument panel-side foundation cloth 82 and the occupant-side foundation cloth 84 has a shape indented toward the inside of the knee airbag 80 at positions in the contact portions. The instrument panel-side foundation cloth 82 and the occupant-side foundation cloth 84 are sewn together at the peripheral portion along the shape. Hereinafter, the portion indented toward the rear of the vehicle (toward the inside of the knee airbag 80) will be referred to as "indentations 86".

[Advantageous Effects]

In the above-described configuration, the pair of right and left indentations 86, which is indented toward the inside of the knee airbag 80, is formed in the knee airbag 80 at the positions in the contact portions that contact the knees 60 of the occupant. Therefore, when the knee airbag 80 is inflated and deployed, the thickness of the knee airbag 80 at the positions where the indentations 86 are formed is smaller than the thickness of the knee airbag 80 at the general portion 80A. Accordingly, as in the first embodiment, even when the gap 66 between the knees 60 of the occupant and the lower portion of the instrument panel 14 is narrow, the knee airbag 80 easily, quickly and smoothly enters the gap 66 and is inflated.

Further, in the embodiment, the shape of each of the instrument panel-side foundation cloth 82 and the occupant-side foundation cloth 84, which constitute the knee airbag 80, is changed. Therefore, it is possible to easily make the thickness of the knee airbag 80 small only at the positions in the contact portions that contact the knees 60 of the occupant, without increasing the number of components. Also, because the number of components is not increased, the knee airbag 80 in the folded state does not take up much space. Further, because the shape of each of the instrument panel-side foundation cloth 82 and the occupant-side foundation cloth 84 is changed, only the process of sewing the instrument panel-side foundation cloth 82 and the occupant-side foundation cloth 84 together at the peripheral portion is required. That is, for example, the process of forming pinched portions in the knee airbag 80 at the positions in the contact portions that contact the knees 60 of the occupant is not required. Therefore, the instrument panel-side foundation cloth 82 and the occupant-side foundation cloth 84 are easily sewn together. As a result, in the embodiment, it is possible to provide the thickness regulation member with a low-cost configuration, and to reduce the size of the knee airbag device 10. Further, it is possible to produce the knee airbag 80 that includes the thickness regulation member, in the substantially same production process as the production process for the conventional knee airbag.

[Supplementary Description of the Above-Described Embodiments]

(1) In each of the above-described embodiments, when a frontal collision occurs, the knee airbag device 10 is operated. However, the invention is not limited to this configuration. A pre-crash sensor may be provided, for example, at the center of a front bumper, and the knee airbag device 10 may be also operated when the pre-crash sensor predicts that a frontal collision will occur.

(2) In each of the above-described embodiments, two cloths, that is, the instrument panel-side foundation cloth 54 or 82, and the occupant-side foundation cloth 56 or 84 are separately formed by cutting cloth, and the instrument panel-side foundation cloth 54 or 82, and the occupant-side foundation cloth 56 or 84 are sewn together at the entire peripheral portion. However, the invention is not limited to this method. For example, one foundation cloth, which has a shape symmetrical with respect to a fold line, may be formed by cutting cloth. In this case, the foundation cloth is folded into two at the fold line, and the two portions of the foundation cloth are sewn together at the peripheral portion excluding the fold line.

(3) The knee airbag 52, 70, or 80 according to each of the above-described embodiments does not include a strap for restricting the thickness of the knee airbag 52, 70, or 80. However, the invention is not limited to this configuration. For example, two straps may be provided at an upper position and a lower position inside the knee airbag to restrict the thickness of the knee airbag when the knee airbag is inflated, in addition to providing the main configuration in each of the embodiments (i.e., the pinched portions 62, the straps 72, or the indentations 86). In this case, the thickness of the knee airbag at the positions where the pinched portions 62, the straps 72, or the indentations 86 are provided is smaller than the thickness of the knee airbag restricted by the two straps, i.e., the upper and lower straps.

(4) The pinched portions 62 are formed by sewing together the instrument panel-side foundation cloth 54 and the occupant-side foundation cloth 56 at the positions in the contact portions that contact the knees 60 of the occupant, when the instrument panel-side foundation cloth 54 and the occupant-side foundation cloth 56 are sewn together at the peripheral portion. However, the pinched portions 62 may be formed by joining together the instrument panel-side foundation cloth 54 and the occupant-side foundation cloth 56 by adhesive agent, welding, or the like.

What is claimed is:

1. A knee airbag device for a vehicle, comprising:
   a gas generation portion that is disposed in a vehicle, and that is operated to generate gas;
   a knee airbag that is stored in a folded state at a predetermined position above knees of an occupant in the vehicle, wherein when the knee airbag receives the gas, the knee airbag is inflated and deployed toward an area below a steering column so that the knee airbag is disposed between knees of an occupant and a lower portion of an instrument panel;
   a peripheral seam portion located on an inside of the knee airbag; and
   a thickness regulation member that is provided on the lower end portion in the knee airbag and on the peripheral seam portion at a position in a contact portion that contacts each of the knees of the occupant, and that regulates a thickness of the knee airbag such that the thickness of the knee airbag at the position in the contact portion is smaller than the thickness of the knee airbag at a portion other than the contact portion.

2. The knee airbag device according to claim 1, wherein:
   the knee airbag further includes an instrument panel-side foundation cloth positioned close to an instrument panel, and an occupant-side foundation cloth positioned close to the occupant; and
   the thickness regulation member is a pinched portion formed by joining together the instrument panel-side foundation cloth and the occupant-side foundation cloth at the position in the contact portion.

3. The knee airbag device according to claim 2, wherein:
   the knee airbag is formed by sewing together the instrument panel-side foundation cloth and the occupant-side foundation cloth at a peripheral portion; and
   when the instrument panel-side foundation cloth and the occupant-side foundation cloth are sewn together at the peripheral portion, the pinched portion is formed by sewing the instrument panel-side foundation cloth and the occupant-side foundation cloth toward an inside of the knee airbag at the position in the contact portion.

4. The knee airbag device according to claim 1, wherein:
   the knee airbag further includes an instrument panel-side foundation cloth positioned close to an instrument panel, and an occupant-side foundation cloth positioned close to the occupant; and
   the thickness regulation member is a connection member made of cloth, which connects the instrument panel-side foundation cloth and the occupant-side foundation cloth in a direction of the thickness of the knee airbag, and which restricts the thickness of the knee airbag at the position in the contact portion.

5. The knee airbag device according to claim 1, wherein:
   the knee airbag further includes an instrument panel-side foundation cloth positioned close to an instrument panel, and an occupant-side foundation cloth positioned close to the occupant; and
   the thickness regulation member is an indentation which is formed in a peripheral portion of the knee airbag at the position in the contact portion, and which is indented toward an inside of the knee airbag, wherein the peripheral portion of the knee airbag is formed by joining the instrument panel-side foundation cloth and the occupant-side foundation cloth at each periphery of the instrument panel-side foundation cloth and the occupant-side foundation cloth.

6. The knee airbag device according to claim 5, wherein:
   the indentation is formed by sewing together the instrument panel-side foundation cloth and the occupant-side foundation cloth, each of which has a shape indented toward the inside of the knee airbag at the position in the contact portion.

7. The knee airbag device according to claim 1, wherein the knee airbag is stored in the folded state inside a column cover for the steering column.

* * * * *